(12) United States Patent
McMillan

(10) Patent No.: US 8,904,992 B2
(45) Date of Patent: Dec. 9, 2014

(54) ENERGY TRANSDUCER

(76) Inventor: Lawrence McMillan, Tulsa, OK (US)

( * ) Notice: Subject to any disclaimer, the term of this patent is extended or adjusted under 35 U.S.C. 154(b) by 399 days.

(21) Appl. No.: 13/463,360

(22) Filed: May 3, 2012

(65) Prior Publication Data

US 2013/0213348 A1 Aug. 22, 2013

Related U.S. Application Data

(60) Provisional application No. 61/518,514, filed on May 6, 2011.

(51) Int. Cl.
*F02B 43/08* (2006.01)

(52) U.S. Cl.
USPC .......................................................... 123/294

(58) Field of Classification Search
USPC ..................... 123/294, 3, 304, 536
See application file for complete search history.

(56) References Cited

U.S. PATENT DOCUMENTS

| | | | |
|---|---|---|---|
| 3,512,508 A | 5/1970 | Winkler | |
| 3,844,262 A | 10/1974 | Dieges | |
| 3,961,609 A | 6/1976 | Gerry | |
| 4,520,763 A | 6/1985 | Lynch et al. | |
| 4,658,776 A | 4/1987 | Coman | |
| 4,793,307 A | 12/1988 | Quenneville et al. | |
| 4,805,571 A | 2/1989 | Humphrey | |
| 4,862,841 A | 9/1989 | Stevenson | |
| 4,944,255 A | 7/1990 | Duret | |
| 5,161,491 A | 11/1992 | Graves | |
| 5,209,190 A | 5/1993 | Paul | |
| 5,255,637 A | 10/1993 | Schechter | |
| 5,509,382 A | 4/1996 | Noland | |
| 5,713,331 A | 2/1998 | Eisenbacher et al. | |
| 5,794,584 A | 8/1998 | Gillespie | |
| 5,867,984 A | 2/1999 | Zedan | |

(Continued)

FOREIGN PATENT DOCUMENTS

| | | |
|---|---|---|
| JP | 2005273505 | 10/2005 |
| JP | 2006029149 | 7/2006 |

(Continued)

OTHER PUBLICATIONS

International Search Report and Written Opinion, Korean Intellectual Property Office, Republic of Korea, Mar. 24, 2014.

(Continued)

*Primary Examiner* — Hieu T Vo
(74) *Attorney, Agent, or Firm* — Head, Johnson & Kachigian, P.C.

(57) ABSTRACT

An energy transducer comprising: a cylinder; a piston within the cylinder connected to a connecting rod extending out of the cylinder and connected to a crankshaft; a chamber within the cylinder defined by the first end of the cylinder and the piston; a direct injector in fluid communication with the chamber and in fluid communication with a fuel tank such that the direct injector is capable of injecting fuel from the fuel tank into the chamber, where the fuel is hydrogen or a mix of hydrogen and oxygen; and an igniter located such that the igniter is capable of igniting the fuel within the chamber; such that ignition of the fuel within the chamber causes an explosion that forces the piston toward the crankshaft, causing the crankshaft to rotate 180°, followed by an implosion that forces the piston away from the crankshaft, causing the crankshaft to complete one full rotation.

10 Claims, 3 Drawing Sheets

(56) References Cited

U.S. PATENT DOCUMENTS

| | | | |
|---|---|---|---|
| 6,161,521 A | 12/2000 | Russ et al. | |
| 6,189,495 B1 | 2/2001 | Tuckey et al. | |
| 6,314,732 B1 * | 11/2001 | Lookholder | 123/536 |
| 6,338,327 B1 | 1/2002 | Ogi et al. | |
| 6,468,122 B1 | 10/2002 | Clements et al. | |
| 6,601,549 B2 | 8/2003 | Clarke | |
| 6,640,773 B2 | 11/2003 | Ancimer et al. | |
| 6,668,769 B1 | 12/2003 | Palazzolo | |
| 6,959,699 B2 | 11/2005 | Shinogle et al. | |
| 7,325,528 B2 | 2/2008 | Schieber et al. | |
| 7,367,306 B1 | 5/2008 | Holden | |
| 7,458,364 B2 | 12/2008 | Allen | |
| 7,584,724 B2 | 9/2009 | Berger | |
| 7,661,409 B2 | 2/2010 | Schule | |
| 8,151,741 B2 * | 4/2012 | Shimasaki et al. | 123/3 |
| 2004/0187813 A1 | 9/2004 | Meyer | |
| 2005/0072407 A1 | 4/2005 | Yu | |
| 2007/0068481 A1 | 3/2007 | Campbell | |
| 2008/0156297 A1 | 7/2008 | Sharpe | |
| 2009/0173322 A1 | 7/2009 | Figl | |
| 2009/0194065 A1 | 8/2009 | Okamura | |
| 2010/0318284 A1 | 12/2010 | Surnilla et al. | |
| 2011/0048374 A1 | 3/2011 | McAlister | |
| 2011/0083637 A1 | 4/2011 | Blount | |
| 2011/0174282 A1 * | 7/2011 | Maruyama et al. | 123/703 |
| 2011/0247583 A1 | 10/2011 | Shkolnik et al. | |
| 2012/0255517 A1 | 10/2012 | Grover, Jr. et al. | |
| 2014/0172219 A1 * | 6/2014 | Nakanishi et al. | 701/22 |

FOREIGN PATENT DOCUMENTS

| | | |
|---|---|---|
| JP | 2007263100 | 10/2007 |
| JP | 2011109891 | 6/2011 |
| KR | 10-2010-0130610 | 12/2010 |
| WO | WO2006088289 | 8/2006 |

OTHER PUBLICATIONS

International Search Report and Written Opinion, Korean Intellectual Property Office, Republic of Korea, Sep. 25, 2013.

* cited by examiner

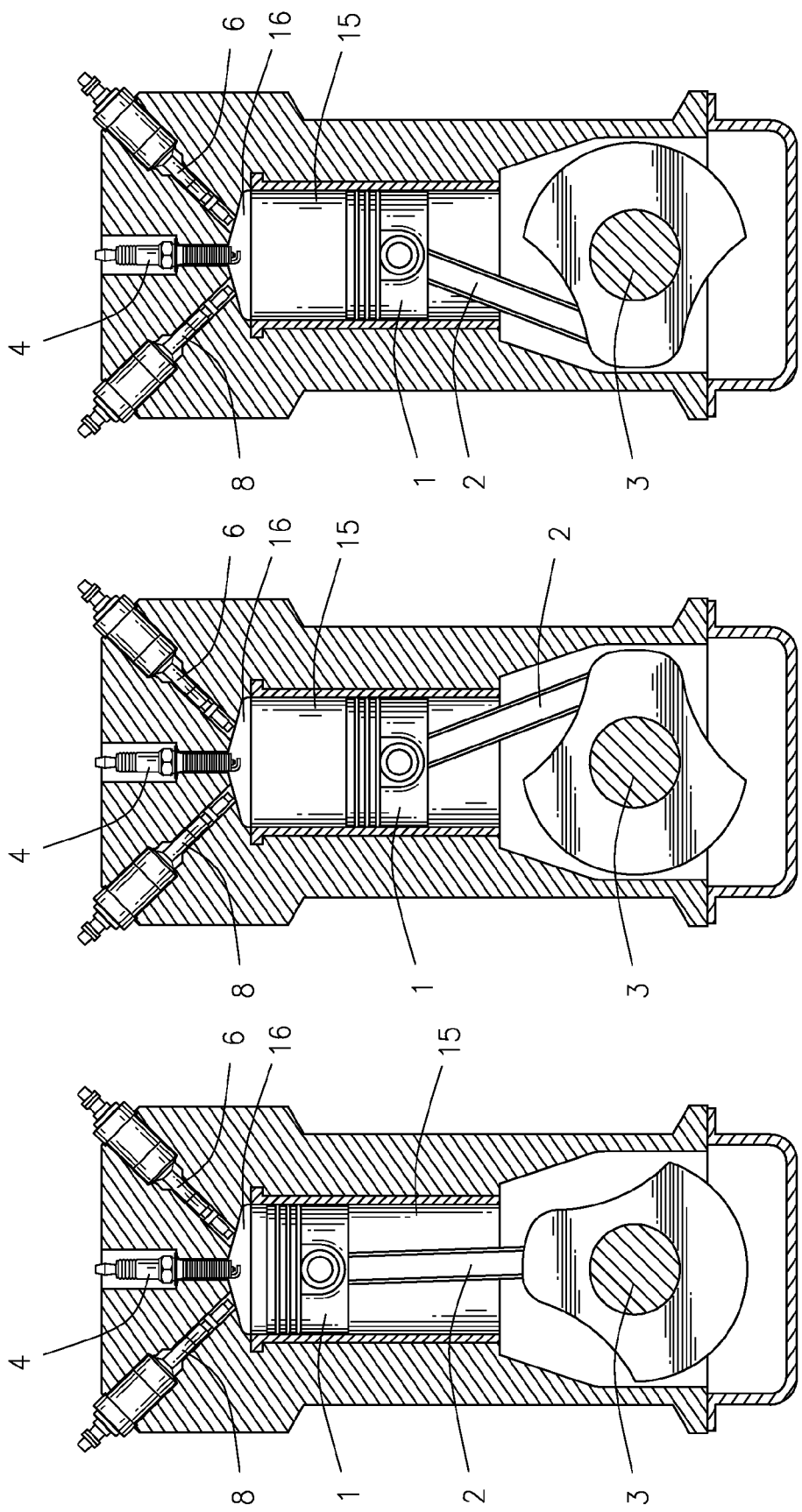

ENERGY TRANSDUCER

CROSS REFERENCE

This application is based on provisional U.S. patent application No. 61/518,514 filed May 6, 2011.

BACKGROUND OF THE INVENTION

1. Field of the Invention

This invention relates generally to an energy transducer, and more particularly, but not by way of limitation, to a single cycle hydrogen powered energy transducer.

2. Description of the Related Art

Internal combustion engines, such as those used in automobiles, typically run on gasoline or other fossil fuel. Such an engine consumes 75% of the energy it produces to perform its task, leaving only 25% of the energy for usable power.

It is desirable to provide an energy transducer that does not depend on fossil fuel.

It is further desirable for such an energy transducer to run on hydrogen.

It is further desirable for such an energy transducer to allow for greater utilization of the energy it creates.

SUMMARY OF THE INVENTION

In general, in a first aspect, the invention relates to an energy transducer comprising: a cylinder with a first end and a second end; a piston within the cylinder, where the piston is connected to a connecting rod extending out of the second end of the cylinder and the connecting rod is connected to a crankshaft; a chamber within the cylinder defined by the first end of the cylinder and the piston; a direct injector in fluid communication with the chamber and in fluid communication with a tank such that the direct injector is capable of injecting gas from the fuel tank into the chamber, where the gas is hydrogen or a mix of hydrogen and oxygen; and an igniter located such that the igniter is capable of igniting the fuel within the chamber; such that ignition of the fuel within the chamber causes an explosion that forces the piston toward the crankshaft, causing the crankshaft to rotate 180°, followed by an implosion that forces the piston away from the crankshaft, causing the crankshaft to complete one full rotation.

The energy transducer may further comprise a hydrogen control valve connected to the direct injector to control the amount of fuel injected into the chamber. The energy transducer may further comprise an extractor in fluid communication with the chamber, where the extractor is connected to a vacuum tank via a vacuum control valve and where a vacuum is maintained within the vacuum tank by a vacuum pump, such that a desired pressure may be maintained within the chamber via the extractor. The extractor, vacuum control valve, vacuum pump, igniter, and direct injector may be controlled by a transducer control unit. The energy transducer control unit may in turn be controlled by a throttle.

The energy transducer may comprise multiple cylinders and a common crankshaft. Each of the cylinders would have the elements listed above, but would each be connected to a single crankshaft.

A method using this energy transducer may comprise providing a cylinder with a first end and a second end; a piston within the cylinder, where the piston is connected to a connecting rod extending out of the second end of the cylinder and the connecting rod is connected to a crankshaft; and a chamber within the cylinder defined by the first end of the cylinder and the piston. Fuel may be injected into the chamber via a direct injector in fluid communication with the chamber and in fluid communication with a fuel tank such that the direct injector is capable of injecting fuel from the fuel tank into the chamber, where the fuel is hydrogen or a mix of hydrogen and oxygen. The fuel in the chamber may be ignited with an igniter, causing an explosion followed by an implosion. The explosion may force the piston toward the crankshaft, causing the crankshaft to rotate 180°, and the implosion may then force the piston away from the crankshaft, causing the crankshaft to complete one full rotation. The engine may further comprise an extractor in fluid communication with the chamber, where the extractor is connected to a vacuum tank via a vacuum control valve and where a vacuum is maintained within the vacuum tank by a vacuum pump, such that a desired pressure may be maintained within the chamber via the extractor, and the method may further comprise establishing the desired pressure within the chamber prior to injecting fuel into the chamber. The method may further comprise controlling the extractor, the vacuum control valve, the vacuum pump, the igniter, and the direct injector via a transducer control unit, and controlling the energy transducer control unit via a throttle.

BRIEF DESCRIPTION OF THE DRAWINGS

FIG. 2 is a cut-away view of the energy transducer at the beginning of a cycle;

FIG. 3 is a cut-away view of the energy transducer partway through a cycle;

FIG. 4 is a cut-away view of the energy transducer approaching the end of a cycle.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
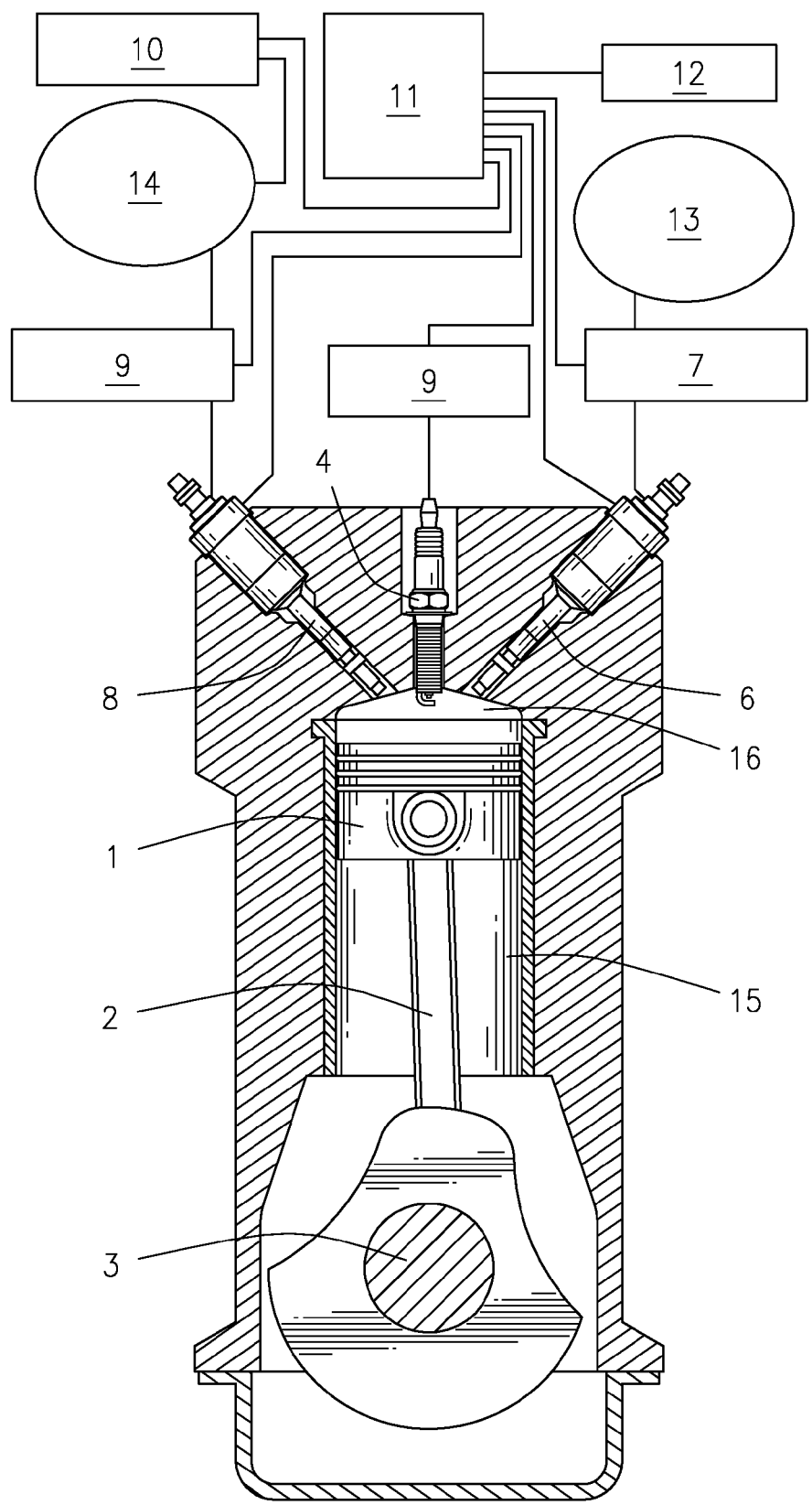
FIG. 1 is diagrammatic view of the energy transducer described herein.

In general, in a first aspect, the invention relates to a single cycle hydrogen powered energy transducer. The energy transducer utilizes hydrogen rather than fossil fuels, capturing the energy within the hydrogen. As used herein, hydrogen may refer to a mixture of hydrogen and oxygen. In the present invention, the energy from the hydrogen is converted to power by a pump, such as a piston pump, rotary pump, thrust pump, or gear pump. FIG. 1 shows a piston pump, comprising a piston 1, a connecting rod 2, and a crankshaft 3.

The energy transducer may comprise a cylinder 15 housing the piston 1 and at least part of the connecting rod 2. A chamber 16 may be formed within one end of the cylinder 15, defined by the piston 1. A direct injector 6 may be connected to the cylinder 15 such that the direct injector 6 may inject hydrogen into the chamber 16. A hydrogen control valve 7 may be connected to the direct injector 6 to control the amount of hydrogen injected into the chamber 16. A hydrogen storage tank 13 may be in fluid communication with the direct injector 6 via the hydrogen control valve 7.

An igniter 4, such as a spark plug, may likewise be connected to the cylinder 15 such that the igniter 4 may ignite the hydrogen within the chamber 16. A transducer control unit 11 may be connected to the cylinder 15 such that the transducer control unit 11 may monitor the pressure/vacuum in the chamber 16 and may adjust the chamber 16 to the proper pressure/vacuum, if required, via an extractor 8 in fluid communication with the chamber 16 and a vacuum tank 14 attached to the extractor 8 via a vacuum control valve 9 and maintained by a vacuum pump 10. The transducer ontrol unit 11 may be in communication with the vacuum pump 10, vacuum control valve 9, and extractor 8. The transducer control unit 11 may also control an ignition coil 5 connected to the igniter 4, the hydrogen control valve 7, and the direct injector 6, thus controlling the overall function of the transducer. The transducer control unit 11 may be connected to a throttle 12, such that an operator of a vehicle utilizing the transducer may control the transducer via the throttle 12.

Figure 5:
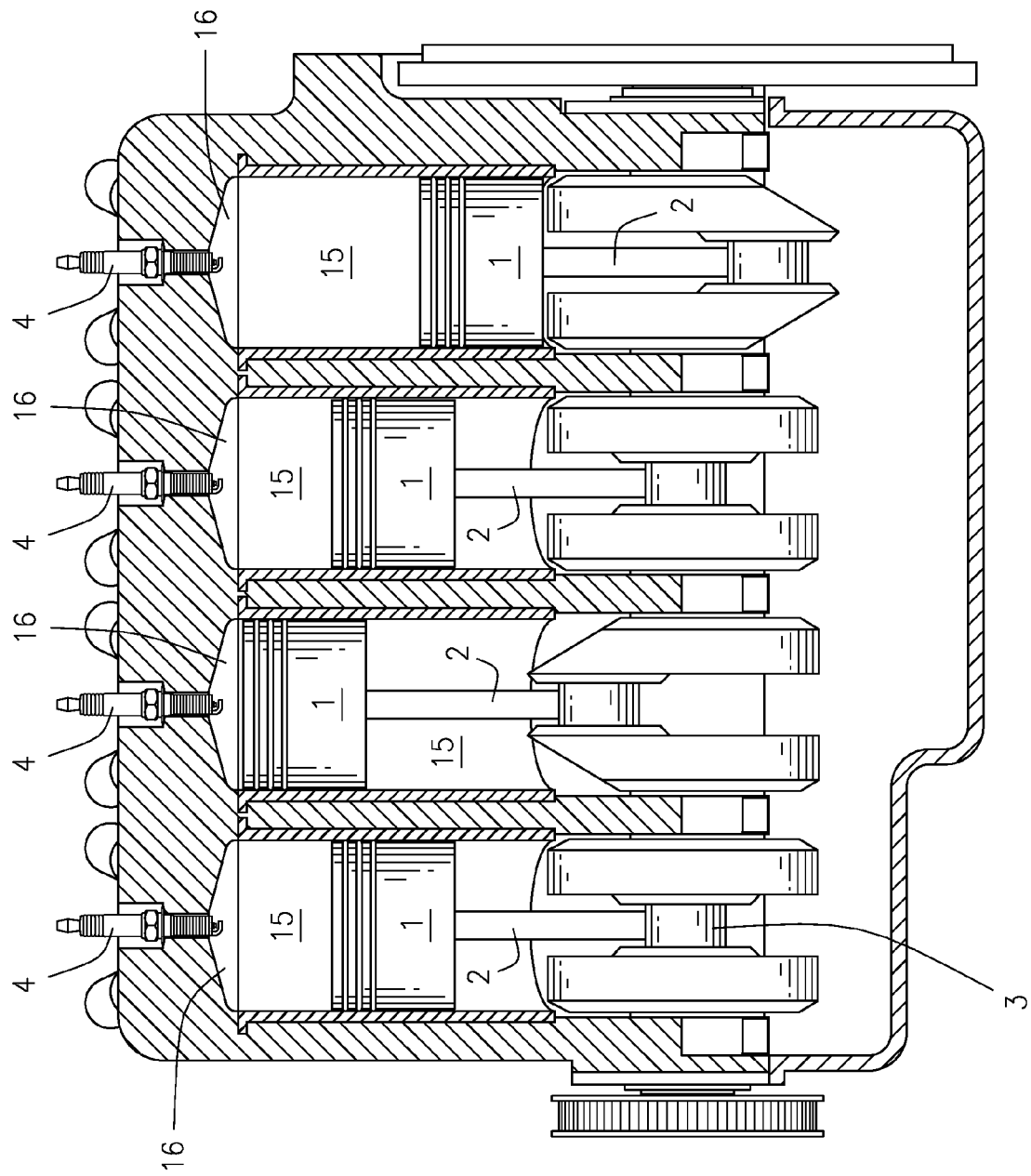
FIG. 5 is a side cut-away view of a four cylinder piston pump energy transducer described herein.

The energy transducer may utilize a single cylinder 15 or multiple cylinders 15 in any configuration. For example, FIG. 5 shows a four cylinder energy transducer utilizing the present invention with each cylinder 15.

In use, the piston 1 may begin in a first position fully extended into the cylinder 15, such that the chamber 16 is as small as possible. The transducer control unit 11 may adjust the pressure within the chamber 16 to an optimal level, if required. The direct injector 6 may inject hydrogen into the chamber 16. The igniter 4 may ignite the hydrogen in the chamber 16, causing the hydrogen to explode. The hydrogen control valve 7 may control the amount of hydrogen required. The energy from the explosion may force the piston 1 along the cylinder 15, increasing the size of the chamber 16. The movement of the piston 1 may cause the connecting rod 2 to likewise move, causing the crankshaft 3 to rotate 180° until the piston 1 is in a second position fully withdrawn into the cylinder 15, such that the chamber 16 is as large as possible, given the stationary nature of the crankshaft 3. The explosion of the hydrogen may then turn into an implosion, creating a vacuum within the chamber 16, which may pull the piston 1 back into the first position, causing the crankshaft 3 to complete one full rotation. This movement may be seen in FIGS. 2, 3, and 4.

The energy/RPMs of the energy transducer may be controlled by the timing and/or size of the explosion of the hydrogen. The deceleration may likewise be controlled by the timing and/or size of the explosion. The explosion/implosion process multiplies the energy within the hydrogen and converts it to power.

Whereas, the devices and methods have been described in relation to the drawings and claims, it should be understood that other and further modifications, apart from those shown or suggested herein, may be made within the spirit and scope of this invention.

What is claimed is:

1. An energy transducer comprising:
   a cylinder with a first end and a second end;
   a piston within the cylinder, where the piston is connected to a connecting rod extending out of the second end of the cylinder and the connecting rod is connected to a crankshaft;
   a chamber within the cylinder defined by the first end of the cylinder and the piston;
   a direct injector in fluid communication with the chamber and in fluid communication with a fuel tank such that the direct injector is capable of injecting fuel from the fuel tank into the chamber, where the fuel is hydrogen or a mix of hydrogen and oxygen; and
   an igniter located such that the igniter is capable of igniting the fuel within the chamber;
   such that ignition of the fuel within the chamber causes an explosion that forces the piston toward the crankshaft, causing the crankshaft to rotate 180°, followed by an implosion that forces the piston away from the crankshaft, causing the crankshaft to complete one full rotation.

2. The energy transducer of claim 1 further comprising a hydrogen control valve connected to the direct injector to control the amount of fuel injected into the chamber.

3. The energy transducer of claim 1 further comprising an extractor in fluid communication with the chamber, where the extractor is connected to a vacuum tank via a vacuum control valve and where a vacuum is maintained within the vacuum tank by a vacuum pump, such that a desired pressure may be maintained within the chamber via the extractor.

4. The energy transducer of claim 3 where the extractor, vacuum control valve, vacuum pump, igniter, and direct injector are controlled by a transducer control unit.

5. The energy transducer of claim 4 where the transducer control unit is controlled by a throttle.

6. The energy transducer of claim 1 further comprising multiple cylinders and a common crankshaft, each cylinder with:
   a piston within the cylinder, where the piston is connected to a connecting rod extending out of the second end of the cylinder and the connecting rod is connected to the crankshaft;
   a chamber within the cylinder defined by the first end of the cylinder and the piston;
   a direct injector in fluid communication with the chamber and in fluid communication with a fuel tank such that the direct injector is capable of injecting fuel from the fuel tank into the chamber, where the fuel is hydrogen or a mix of hydrogen and oxygen; and
   an igniter located such that the igniter is capable of igniting the fuel within the chamber;
   such that ignition of the fuel within each chamber causes an explosion that forces the piston toward the crankshaft, causing the crankshaft to rotate 180°, followed by an implosion that forces the piston away from the crankshaft, causing the crankshaft to complete one full rotation.

7. A method of transducing energy from hydrogen, the method comprising:
   providing:
      a cylinder with a first end and a second end;
      a piston within the cylinder, where the piston is connected to a connecting rod extending out of the second end of the cylinder and the connecting rod is connected to a crankshaft; and
      a chamber within the cylinder defined by the first end of the cylinder and the piston;
   injecting fuel into the chamber via a direct injector in fluid communication with the chamber and in fluid communication with a fuel tank such that the direct injector is capable of injecting fuel from the fuel tank into the chamber, where the fuel is hydrogen or a mix of hydrogen and oxygen;
   igniting the fuel in the chamber with an igniter, causing an explosion followed by an implosion;
   allowing the explosion to force the piston toward the crankshaft, causing the crankshaft to rotate 180°; and
   allowing the implosion to force the piston away from the crankshaft, causing the crankshaft to complete one full rotation.

8. The method of claim 7 where the method further comprises:
   providing an extractor in fluid communication with the chamber, where the extractor is connected to a vacuum tank via a vacuum control valve and where a vacuum is maintained within the vacuum tank by a vacuum pump, such that a desired pressure may be maintained within the chamber via the extractor; and
   establishing the desired pressure within the chamber prior to injecting fuel into the chamber.

9. The method of claim 8 further comprising controlling the extractor, the vacuum control valve, the vacuum pump, the igniter, and the direct injector via a transducer control unit.

10. The method of claim 9 further comprising controlling the transducer control unit via a throttle.

\* \* \* \* \*